United States Patent

Sadler

[11] 4,040,549
[45] Aug. 9, 1977

[54] THREE IN ONE CAR CUP AND HOLDER

[76] Inventor: Clyde John Sadler, 207 Lansing, Lynchburg, Va. 24503

[21] Appl. No.: 580,884

[22] Filed: May 27, 1975

[51] Int. Cl.$^2$ .............................................. B60N 3/10
[52] U.S. Cl. ............................. 224/29 G; 215/100 R; 220/85 H; 220/212; 248/154; 248/311.1; 248/346.1
[58] Field of Search ............... 224/29 R, 29 G, 29 H, 224/29 K, 29 L, 42.42 R, 42.42 A, 29 D, 42.45 R, 42.45 B; 108/44, 45; 248/154, 311.1, 313, 346.1; 294/32; 215/100.5, 100 R; 220/9 F, 85 H, 212

[56] References Cited

U.S. PATENT DOCUMENTS

| 648,436 | 5/1900 | Rider | 215/100 R X |
|---|---|---|---|
| 1,487,574 | 3/1924 | Jordan | 224/29 G |
| 2,589,967 | 3/1952 | Sawyer | 215/100.5 |
| 2,640,595 | 6/1953 | Byford | 224/29 D X |
| 2,678,127 | 5/1954 | Sinko | 224/29 R |
| 3,050,223 | 8/1962 | Scioloro | 224/29 R |
| 3,148,636 | 9/1964 | Bloomquist | 108/44 X |
| 3,624,788 | 11/1971 | McMahon | 294/32 |
| 3,642,122 | 2/1972 | Ende | 224/42.42 R |
| 3,670,936 | 6/1972 | Pronovost | 224/42.42 R |
| 3,730,374 | 5/1973 | Picciano | 220/9 F |
| 3,791,547 | 2/1974 | Branscum | 220/9 F X |
| 3,941,237 | 3/1976 | MacGregor | 220/85 H |

FOREIGN PATENT DOCUMENTS

| 336,948 | 4/1959 | Switzerland | 248/311 R |
|---|---|---|---|
| 1,198,352 | 7/1970 | United Kingdom | 220/9 F |
| 398,083 | 9/1933 | United Kingdom | 248/154 |

*Primary Examiner*—Robert J. Spar
*Assistant Examiner*—Winston H. Douglas

*Attorney, Agent, or Firm*—Mason, Fenwick & Lawrence

[57] ABSTRACT

A cup and holder assembly including a cover wherein the assembly may be mounted on a surface such as the dashboard of a vehicle to provide the driver or passengers in the vehicle with a drinking cup which may be secured in the holder to prevent spillage of the contents in the cup which may be coffee or may be coins carried for the payment of tolls. The holder has a generally flat bottom surface to which a double adhesive panel may be bonded to permit attachment of the holder to the dashboard and has a cylindrical outer wall for retaining the cup when the cup is positioned in the holder. Two generally vertical slots are diametrically opposed in the inner surface of the outer cylindrical wall and at the bottom of each slot are circumferential slots extending in opposite directions from the vertical slots with said circumferential slots tapered to narrower widths away from the vertical slots. The cup is of generally conventional configuration and may include a handle with the base of said cup fitting closely within the outer cylindrical wall of the holder and has two outwardly extending tabs which are insertable into the vertical slots. The base of the cup rests on the inner surface of the bottom of the holder thereby permitting the cup to be rotated to cause the tabs to frictionally lock in the tapered circumferential slots thereby preventing the contents of the cup from being spilled due to tipping of the cup. The cover includes a circular disc with an outer downwardly extending wall and an inner downwardly extending lip which frictionally fit over the upper edge of the cup when the cup is positioned on the cup holder. The cover also fits over the outer cylindrical wall of the holder when the cup is not in the holder thereby retaining coins or the like in the holder.

2 Claims, 6 Drawing Figures

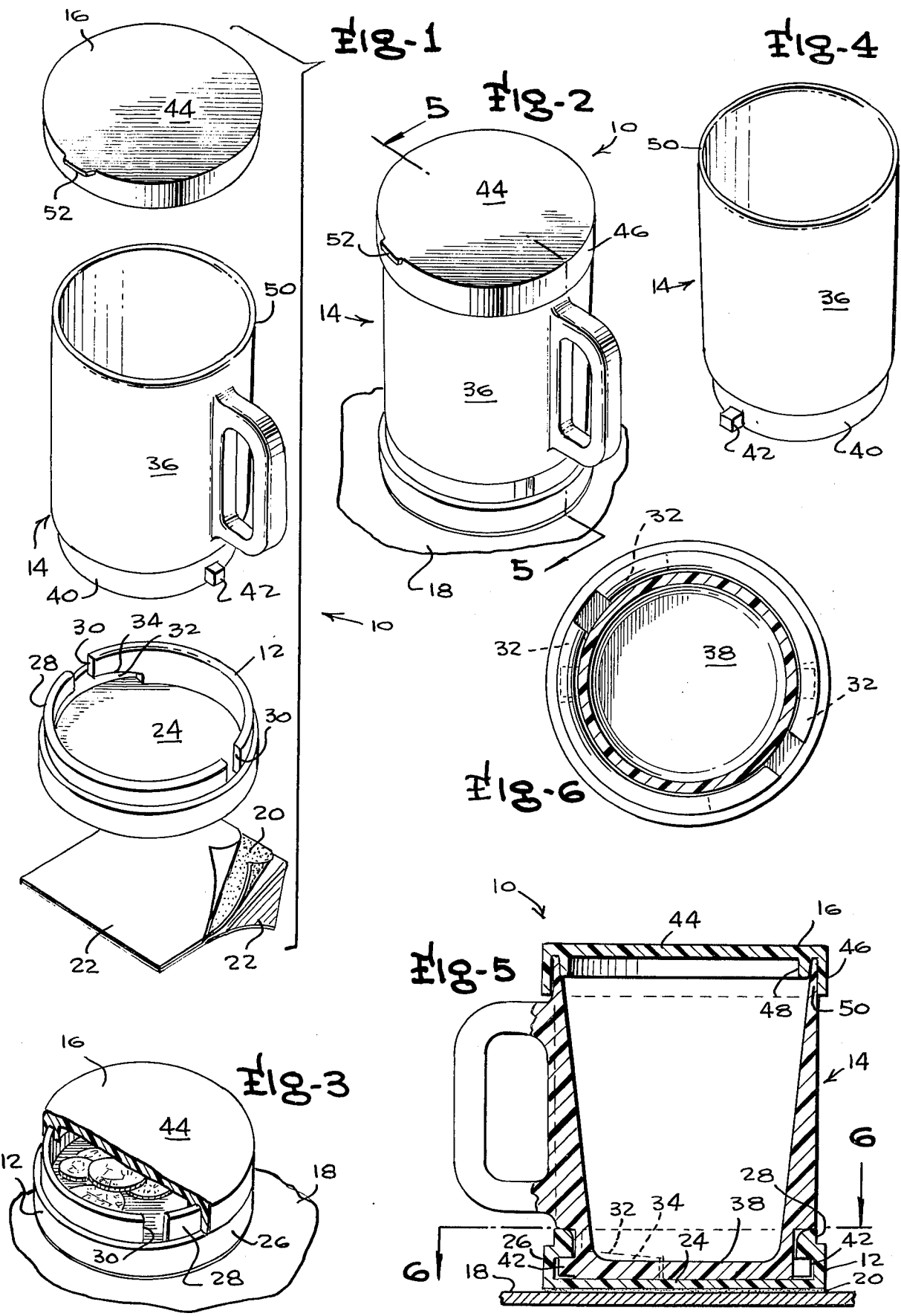

THREE IN ONE CAR CUP AND HOLDER

This invention is in the field of vehicle assessories and is specifically directed to a cup and holder assembly which is mountable on the dashboard of a vehicle and which prevents tipping of the cup when it is positioned in the holder.

The prevention of spillage of liquid carried in cups in a vehicle is a difficulty which has been experienced by most drivers and passengers. This unpleasant experience results from the frequent acceleration, deceleration and bouncing of a vehicle caused by varying road and traffic conditions as are experienced under normal driving conditions. These same difficulties are experienced, although perhaps to a lesser degree, at times in boats, airplanes, trains and busses. With the rapid increase in the number of vehicles on land and water and in the air today and the rapid increase in the number of passenger miles traveled, there is an increasing demand for a cup and holder assembly which may be used in a vehicle which may be subjected to rapid accelerations and decelerations and also to rather violent pitching and rolling caused by bumpy roads.

A number of devices have previously evolved for the purpose of retaining a cup in a holder which may be mounted in a vehicle. These devices have generally included a holder which is permanently mounted on the dashboard of the vehicle. The holders have generally included an upwardly directed lip around the edge of a tray to prevent cups and the like from sliding off of the tray. Other previously known cup and holder assemblies have frictionally retained cups which are pressed against ribs extending outwardly into cup holder openings. Such devices have been effective only when the motions of the vehicle are generally gentle and these devices have not prevented spillage under the more severe conditions generally experienced during vehicle travel.

Therefore, it is the primary object of the present invention to provide a new and improved cup and holder assembly for use in vehicles.

An additional object of the present invention is to provide a cup and holder assembly in which the cup may be positively secured to a holder which is fixedly attached to the dashboard of a vehicle thereby preventing spillage of the contents of the cup due to tipping of the cup.

An additional object of the present invention is to provide a cup and holder assembly having a cup cover which is mountable on the cup to prevent the contents of the cup from splashing out and which is mountable on the holder when the cup is removed to retain coins and the like in a cup receiving opening in the holder.

A still further object of the present invention is to provide a cup and holder assembly which is mountable on the dashboard of the vehicle by a double adhesive panel attached to the bottom of the holder which may then be pressed against the dashboard or the like to position the cup and holder assembly in any desired position.

Another object of the present invention is to provide a cup and holder assembly in which the cup is positively retained in the holder and may be inserted into the holder in more than one position.

A still further object of the present invention is to provide a cup and holder assembly in which the cup is positively retained in the holder and may be inserted into the holder conveniently by a left-handed or right-handed person.

The objects of the present invention are achieved through the provision of a holder having a bottom to which a double adhesive backed-panel is attached thereby permitting positioning of the holder in any desired position. The holder has a cylindrical side wall having diametrically opposed generally vertical slots on the inner surface of the cylindrical side wall and having circumferential slots connected to and extending from the lower end of the vertical slots adjacent the holder bottom. Each circumferential slot has an upper surface which tapers downwardly away from the vertical slots. The cup has a cylindrical base which is insertable into the cup holder fitting closely within the cylindrical side wall. The base has outwardly extending tabs which fit into the vertical slots and may be rotated into the circumferential slots to a locked position therein against the tapering upper surface of the slots. The cover is circular with a downwardly extending cylindrical outer wall and a downwardly extending inner lip thereby permitting the cover to be pressed onto the upper lip of the cup. The cover may also be pressed onto the cylindrical wall of the holder when the cup is not positioned in the holder thereby preventing splashing of the contents of the cup or bouncing out of the contents such as coins contained within the holder if the cup has been removed.

A better understanding of the preferred embodiment of the subject invention will be enabled when the following written description is considered in conjunction with the appended drawings in which:

FIG. 1 is an exploded perspective view of the preferred embodiment of the present invention;

FIG. 2 is a perspective view of the preferred embodiment of the present invention in the assembled condition on a fragmentary portion of a surface;

FIG. 3 is a fragmentary view of the present invention with the cup removed from the holder and the cover positioned on the holder to protect coins carried therein;

FIG. 4 shows the second tab on the backside of the cup shown in FIG. 1;

FIG. 5 is a partial sectional view taken along lines 5—5 of FIG. 2;

FIG. 6 is a sectional view taken along lines 6—6 of FIG. 5.

Attention is invited to FIG. 1 of the drawings in which is illustrated the preferred embodiment of the invention, generally designated 10, which includes a holder 12, a cup 14 and a cover 16.

Attachment of the holder 12 to the dashboard 18 as shown in FIGS. 2, 3, and 5 is achieved by providing a double adhesive backed panel 20 as shown in FIG. 1 which is protected by two cover panels 22 to prevent the adhesive panel 20 from adhering to anything until the protective panels 22 are removed. The adhesive panel may be preassembled to the bottom of the holder 12 prior to shipmment to the consumer.

The bottom 24 of the holder 12 is circular with a cylindrical side wall 26 extending upwardly from the outer circumference of the holder bottom. The side wall 26 has a recessed cylindrical upper lip 28 which receives the cover 16 as shown in FIG. 3. Two diametrically opposed generally vertical slots 30 extend downwardly through the upper cylindrical lip 28 and the cylindrical side wall 26 and communicate with oppositely directed circumferential slots 32 as best shown in FIG. 1. Each circumferential slot has a downwardly tapering upper surface 34 which is best shown in FIG. 1.

While the cup 14 is of generally conventional configuration having a cylindrical outer wall 36, and a bottom 38, the cup has a cylindrical lower surface 40 adjacent the bottom of the cup and dimensioned to fit closely within the inner surface of the cylindrical side wall 26. Two diametrically opposed tabs 42 extend outwardly from the lower cylindrical surface 40 of the cup 14 and are insertable into the vertical slots 30 as the cup 14 is pressed downwardly into the holder 12. The tabs 42 are then rotated into the circumferential slots 32 in either a clockwise direction or a counterclockwise direction until the upper surface of the tab comes into contact with the downwardly tapering surface 34 of the circumferential slot 32 thereby positively locking the cup in the holder.

The contents of the cup 14 or the holder 12 may be protected by the cover 16 which includes a circular top portion 44 having a downwardly extending cylindrical outer wall 46 and a downwardly projecting inner lip 48 which fit closely adjacent opposite sides of the upper lip 50 of the cup. The cover 16 permits closing the cup to prevent spillage during movement of the vehicle. The cover also fits closely over the upwardly projecting lip 28 of the cup holder as shown in FIG. 3 which is similar in configuration to the upper lip 50 of the cup to close the holder for carrying change or the like as shown in FIG. 3.

Extending outwardly from the outer cylindrical wall 46 of the cover 16 is a lift tab 52 which permits easy removal of the cover from the cup when use of the cup is desired. The lift tab also permits easy removal of the cover from the cup holder as shown in FIG. 3 when money is required for payment of tolls and the like.

The holder, cup and cover may be formed of a thermal setting plastic, metal or any other desired material. Additionally, the holder 12 may be attached to a desired surface by a mounting screw or bolt through the bottom 24 of the holder.

Numerous modifications of the subject invention will undoubtedly occur to those will skill in the art; however, it should be understood that the spirit and scope of the invention is to be limited solely in light of the appended claims.

I claim:

1. A non-spilling cup and coin holder assembly for mounting in vehicles or the like, said assembly comprising a holder having a bottom with an upwardly projecting side wall forming an inner bore, said inner bore having generally vertical slots connecting with circumferential slots extending from the vertical slots, an adhesive attachment means for fastening the holder to the dashboard of the vehicle, a cup having an upper lip and a generally cylindrical base of a diameter smaller than the diameter of said inner bore and insertable into said inner bore, said cup having outwardly directed tabs insertable into said vertical slots and circumferential slots, and a cover means having an internal diameter slightly larger than both the cup's upper lip and the holder's side walls and being selectively attachable to said upper lip of the cup or to an upper portion of said upwardly projecting sidewall of said holder when said cup is not positioned in said holder thereby providing a covered cup which is securely held in position by the holder to prevent any spilling from the cup and also to provide a covered holder for retaining coins and the like when the cup has been removed from the holder and the cover means has been attached to the holder.

2. The cup and holder assembly of claim 1 wherein the cover means includes a disc having a downwardly projecting outer cylindrical wall and having an inwardly displaced downwardly projecting cylindrical lip with the space between the outer wall and the inner lip providing a recess for receiving the upper lip of the cup and the upper portion of the holder thereby frictionally retaining the cover on the cup or holder.

* * * * *